(12) United States Patent
Hui (10) Patent No.: US 7,340,016 B2
(45) Date of Patent: Mar. 4, 2008

(54) EQUALIZERS FOR MULTI-BRANCH RECEIVER

(75) Inventor: Dennis Hui, Cary, NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 540 days.

(21) Appl. No.: 10/889,641

(22) Filed: Jul. 12, 2004

(65) Prior Publication Data

US 2004/0247055 A1 Dec. 9, 2004

Related U.S. Application Data (63) Continuation-in-part of application No. 09/853,207, filed on May 11, 2001, now Pat. No. 6,778,619.

(51) Int. Cl.
*H04L 1/02* (2006.01)
*H04B 1/10* (2006.01)
*H04B 7/02* (2006.01)

(52) U.S. Cl. .................. 375/347; 375/350; 455/137

(58) Field of Classification Search ............. 375/267, 375/347, 229, 230, 232, 233, 316, 346, 350, 375/261, 262; 333/18, 28 R; 455/132, 137, 455/130; 275/229–235
See application file for complete search history.

(56) References Cited

U.S. PATENT DOCUMENTS

| | | | |
|---|---|---|---|
| 5,202,903 A | | 4/1993 | Okanoue |
| 5,727,032 A | * | 3/1998 | Jamal et al. .............. 375/347 |
| 5,859,870 A | * | 1/1999 | Tsujimoto .................. 375/143 |
| 6,075,808 A | * | 6/2000 | Tsujimoto .................. 375/143 |
| 6,104,766 A | | 8/2000 | Coker et al. |
| 6,130,909 A | | 10/2000 | Anvari et al. |
| 6,314,147 B1 | | 11/2001 | Liang et al. |
| 6,466,616 B1 | | 10/2002 | Stenstrom et al. |
| 6,560,299 B1 | * | 5/2003 | Strolle et al. .............. 375/347 |
| 6,590,932 B1 | | 7/2003 | Hui et al. |
| 6,608,862 B1 | * | 8/2003 | Zangi et al. ............... 375/232 |
| 6,693,568 B2 | | 2/2004 | Olivier |
| 6,970,520 B1 | * | 11/2005 | Lindbom et al. .......... 375/340 |
| 2002/0141437 A1 | | 10/2002 | Meyer et al. |
| 2002/0176492 A1 | | 11/2002 | Zangi et al. |
| 2003/0063596 A1 | | 4/2003 | Arslan et al. |

(Continued)

FOREIGN PATENT DOCUMENTS

EP 1229697 1/2002

(Continued)

OTHER PUBLICATIONS

Forney, "Maximum-Likelihood Sequence Estimation Digital Sequence in the Presence of Intersymbol Interference," 1972, IEEE, pp. 363-378.*

(Continued)

*Primary Examiner*—Tesfaldet Bocure
(74) *Attorney, Agent, or Firm*—Coats & Bennett, P.L.L.C.

(57) ABSTRACT

A multi-branch receiver comprises a plurality of signal branches including branch filters to filter respective branch input signals and to produce corresponding branch output signals, a combiner to combine the branch output signals to produce a combined baseband signal, a pre-filter to filter the combined baseband signal to produce a received signal with minimum phase channel characteristics, and an equalizer to generate an estimate of a data sequence contained in the received signal.

24 Claims, 4 Drawing Sheets

U.S. PATENT DOCUMENTS

| | | |
|---|---|---|
| 2003/0161258 A1 | 8/2003 | Zhang et al. |
| 2004/0001537 A1 | 1/2004 | Zhang et al. |

FOREIGN PATENT DOCUMENTS

| | | |
|---|---|---|
| WO | WO 01/60002 | 1/2001 |
| WO | WO 02/33923 | 10/2001 |
| WO | WO 02/39689 | 11/2001 |
| WO | WO 02/93818 | 5/2002 |
| WO | WO 03/073609 | 2/2003 |

OTHER PUBLICATIONS

Ungerboeck, "Adaptive Maximum-Likelihood receiver for Carrier Modulated Data Transmission Systems," 1974, IEEE Transaction on Communication, pp. 624-636.*

Eyuboglu,"Reduced-State Sequence Estimation for Coded Modulation on Intersymbol Interference Channels," 1989, IEEE, pp. 989-995.*

McGinty et al., "Reduced-State Sequence Estimator with Reverse-Time structure," 1997, IEEE, pp. 265-268.*

Baddour et al., "Analysis of Optimum Diversity Combining and Decision Feedback Equalization in Dispersive Rayleigh Fading," Communication Theory Mini-Conference 1999, Jun. 6, 1999, p. 21-26, IEEE, Piscataway, NJ.

Alamouti S M, "A Simple Transmit Diversity Technique for Wireless Communications," IEEE Journal on Selection Areas in Communications, Oct. 1998, p. 1451-1458, vol. 16, No. 8, IEEE Inc., New York, NY.

G. Tuinnicliffe Wilson, "The Factorization of Matricial Spectral Densities," SIAM J. Appl. Math., vol. 23, No. 4, Dec. 1972, pp. 420-426.

G. Wilson, "Factorization of the Covariance Generating Function of a Pure Moving Average Process," SIAM J. Numer. Anal., vol. 6, No. 1, Mar. 1969.

* cited by examiner

EQUALIZERS FOR MULTI-BRANCH RECEIVER

RELATED APPLICATIONS

This application is a continuation-in-part of U.S. application Ser. No. 09/853,207, now U.S. Pat. No. 6,778,619, filed on May 11, 2001, which is incorporated in its entirety by reference herein.

BACKGROUND OF THE INVENTION

Co-channel interference (CCI) and intersymbol interference (ISI) are two major impediments limiting the capacity of cellular networks. Co-channel interference results when two or more simultaneous transmissions occur on the same frequency. In the case of TDMA systems, such as GSM/EDGE systems, co-channel interference is primarily due to frequency reuse. In order to increase system capacity, a radio frequency carrier is reused in multiple cells. A signal received by a receiver will contain not only the desired signal, but will also contain unwanted signals from other co-channel cells. The minimum distance between co-channel cells is dependent on the maximum tolerable co-channel interference at the receiver. Receivers resistant to co-channel interference allow greater frequency reuse and hence greater system capacity.

Diversity techniques have been used to mitigate co-channel interference. One form a diversity is known as receiver diversity. A receiver with two or more antennas receives the desired signal over independently fading channels. Since the same interfering signals are present in the signal received over each diversity path, the received signals can be combined to suppress CCI and improve the signal to noise ratio (SNR).

ISI is caused by multipath fading in bandlimited, time-dispersive channels. ISI distorts the transmitted signal so that adjacent pulses overlap one another. ISI has been recognized as a major obstacle to high speed data transmission over mobile radio channels. ISI is mitigated by equalizers at the receiver. The optimal receiver for detection of a received signal in the presence of ISI is the maximum likelihood sequence estimation (MLSE) receiver. Instead of estimating each symbol individually, a MLSE receiver attempts to find the sequence with the greatest probability of being correct. Using an estimate of the channel, the MLSE receiver computes a likelihood metric for hypothesized sequences and chooses the sequence that produces the maximum likelihood metric. Using the MLSE for equalization was first proposed by Forney in *Maximum-Likelihood Sequence Estimation of Digital Sequences in the Presence of Intersymbol Interference*, IEEE Trans. Info. Theory, vol. IT-18, pp. 363-378, May 1972, and is further explored by Ungerboeck in *Adaptive Maximum-Likelihood Reciever for Carrier Modulated Data-Transmission Systems*, IEEE Transactions On Communications, vol COM-22, pp. 624-636, May 1974.

A MLSE receiver may be implemented using the Viterbi algorithm. The Viterbi algorithm is a recursive technique that simplifies the problem of finding the shortest path through a trellis. Each path through the trellis corresponds to one possible transmitted sequence and each branch corresponds to a possible transmitted symbol. Each branch of the trellis is assigned a branch metric that represents the likelihood that the corresponding symbol is part of the transmitted sequence. A path metric is then computed for a path by summing the branch metrics comprising the path. The path that most closely matches the received symbol sequence is the one with the lowest path metric.

The way that the equalizer is implemented has a significant impact on the cost of the wireless receiver, since the equalizer complexity typically comprises a substantial portion of the overall receiver complexity. For equalizers implemented using the Viterbi algorithm, their complexity depends on the complexity of the metric used to evaluate the likelihoods of different hypothesized sequences.

For single-antenna receivers, two well-known equalizer metrics are the Forney metric and the Ungerboeck metric. Though the two metrics are equivalent, the Forney metric has the advantage of being geometrically intuitive and easy to compute, since it is based on the Euclidean distance. In addition, most of the practical reduced-complexity equalization techniques found in the literature, such as the decision feedback sequence estimation (DFSE) equalizers and reduced-state sequence estimation (RSSE) equalizers, are based on the Forney metric.

For multiple-antenna receivers, the Forney equalizer metric is typically implemented as the sum of squared Euclidean distances over the received signals from all antennas. This implementation is known as metric combining. As a result, the equalizer complexity increases directly with the number of antennas when the Forney metric is used. When the Ungerboeck metric is used in a multiple antenna receiver, the received signals from each antenna are matched filtered and combined before the branch metric is computed. Thus, the complexity of the equalizer is independent of the number of antennas when the Ungerboeck metric is used. However, the Ungerboeck metric is more computationally complex than the Forney metric, and there are fewer reduced complexity techniques based on the Ungerboeck metric.

SUMMARY OF THE INVENTION

The present invention provides an efficient method for implementing equalizers with the Forney metric in multiple-branch receivers, such as diversity receivers. A novel prefilter allows the same equalizer designed for a single-branch or single antenna receiver to be used in multi-branch receivers. Branch input signals are filtered and combined to produce a combined baseband signal. The combined baseband signal is then filtered in a prefilter designed to provide minimum phase channel characteristics. The resulting received signal is then input to the equalizer.

The present invention may be applied to any receivers with multiple branches of received signals, regardless of the actual number of physical antennas that the receiver has. Multiple branches of received signals may be obtained from a single-antenna receiver, for example, by sampling the analog received signal at different sampling phases or by treating the in-phase (I) and quadrature-phase (Q) components of a complex received signal as two separate branches, or by a combination of these, etc.

The present invention allows the software or hardware designed for single-antenna receivers with the Forney metric to be reused in a multiple antenna receiver. This is particularly attractive for the development of mobile stations with multiple-receive antennas. Moreover, the equalizer of the present invention is largely independent of the particular trellis search technique adopted by the equalizer. The same proposed receiver structure can be used with any reduced-state equalizers as well as a full-search, maximum-likelihood sequence estimation (MLSE) equalizer, providing a direct venue for applying the existing techniques of reducing equalizer complexity to multiple-branch and multiple-antenna receivers.

DETAILED DESCRIPTION OF THE INVENTION

Referring now to the drawings, the present invention will be described in the context of a mobile terminal 10 in a wireless communication system. The present invention, however, may be embodied in many different devices, and the illustrated embodiment should not be construed as limiting.

Figure 1:
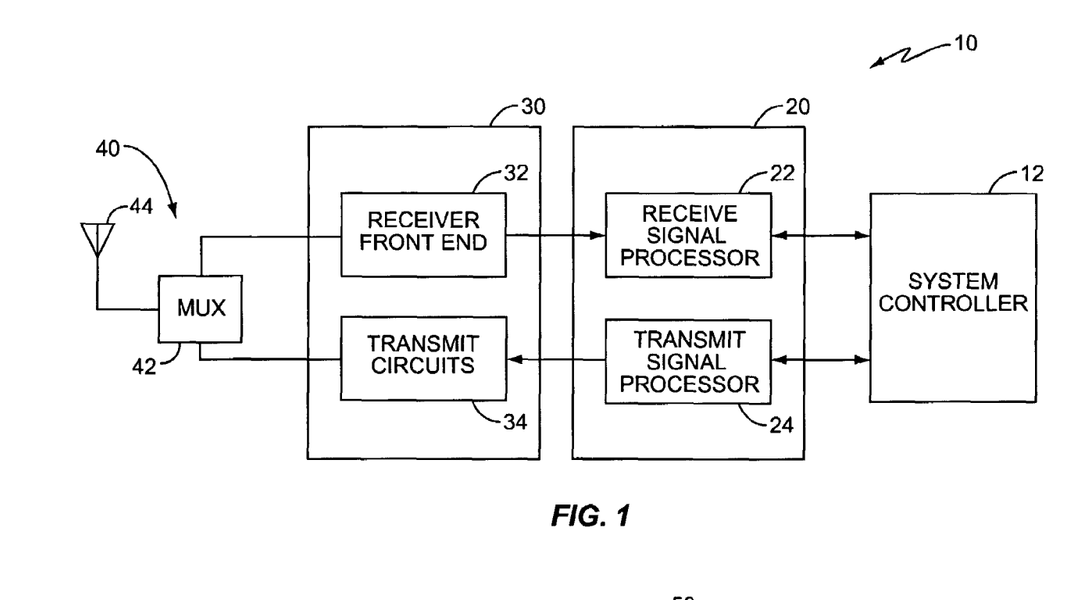
FIG. 1 is a functional block diagram of a mobile terminal.

The mobile terminal 10 includes a system controller 12, a baseband processor 20, a RF section 30, and an antenna assembly 40. The system controller 12 controls the overall operation of the mobile terminal 10 according to program instructions stored in memory. The baseband processor 20 processes signals transmitted and received by the mobile terminal 10. The baseband processor 20 includes a receive signal processor 22 and transmit signal processor circuits 24. RF section 30 interfaces the baseband processor 20 with the antenna assembly 40. RF section 30 includes a receiver front end 32 and transmit circuits 34. Receiver front end 32 downconverts the received signal to the baseband frequency, amplifies the received signal, and performs A-to-D conversion to produce a baseband signal suitable for input to the receive signal processor 22. Transmit circuits 34 include the necessary RF components to modulate the transmitted sequence output by the transmit signal processor 24 onto an RF carrier, and to filter and amplify the transmitted signal.

Antenna assembly 40 comprises an RF switch or multiplexer 42 that permits full duplex operation, and one or more antennas 44. Signals received by the antenna assembly 40 are passed to the receiver front end 32 and transmit signals output by the transmit circuits 34 applied to the antenna assembly 40. Although only a single antenna 44 is shown, those skilled in the art will appreciate that the mobile terminal 10 may include multiple antennas 44. In embodiments with multiple antennas 44, a separate receiver front end 32 may be provided for each antenna 44.

In wireless communication systems, the received signal is corrupted by interference. Two major forms of interference are co-channel interference (CCI) and intersymbol interference (ISI). To suppress CCI, the receiver may include two or more antennas 44. Because the same interfering signals are present in the signal received over each diversity path, the received signals can be combined to suppress CCI and improve the signal to noise ratio (SNR). ISI is typically mitigated by equalizers at the receiver. The optimal receiver for detection of a received signal in the presence of ISI is the maximum likelihood sequence estimation (MLSE) receiver. An MLSE receiver may be implemented using the Viterbi algorithm in receive signal processor 22.

Two well-known equalizer metrics for implementing the Viterbi algorithm are the Forney metric and the Ungerboeck metric. Though the two metrics are equivalent, the Forney metric has the advantage of being geometrically intuitive and easy to compute, since it is based on the Euclidean distance. In addition, most of the practical reduced-complexity equalization techniques found in the literature, such as the decision feedback sequence estimation (DFSE) equalizers and reduced-state sequence estimation (RSSE) equalizers, are based on the Forney metric.

Figure 2:
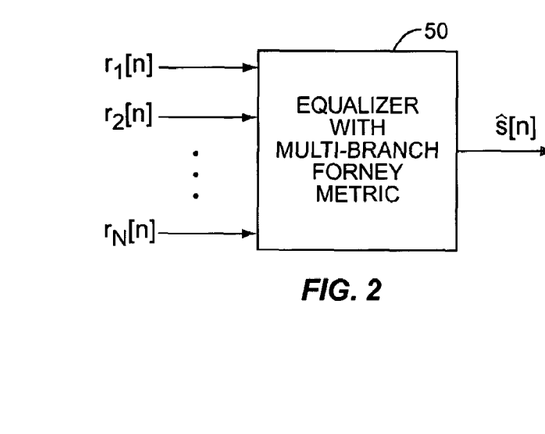
FIG. 2 is a block diagram of equalizer for a multi-branch receiver that uses a multi-branch Forney metric.

The equalizer 50 shown in FIG. 2 uses a multi-branch Forney metric to compute branch metrics. An equalizer 50 for a multiple antenna receiver is illustrated in FIG. 2. The received signal from each antenna 44 is input to the equalizer 50. The equalizer 50 computes the branch metrics as the sum of squared Euclidean-distance metrics over all antennas 44. Specifically, the equalizer 50 computes the following branch metric based directly on the multiple received signals:

$$M_1(r, h, s) = \sum_n \sum_{i=1}^{N_r} \left| r_i[n] - \sum_{k=0}^{L-1} h_i[k]s[n-k] \right|^2 \qquad \text{Eq. 1}$$

where $N_r$ denotes the number of antennas 44, $\{s[n]\}$ denotes the (hypothesized) transmitted symbol sequence, $r_i[n]$ denotes the signal received from the $i^{th}$ antenna, and $h_i[n]$ denotes the channel response for the $i^{th}$ antenna of (maximal) length L, respectively. This approach is referred to as metric combining. With the metric combining approach, the complexity of the branch metric calculation grows linearly with the number of antennas.

Figure 3:
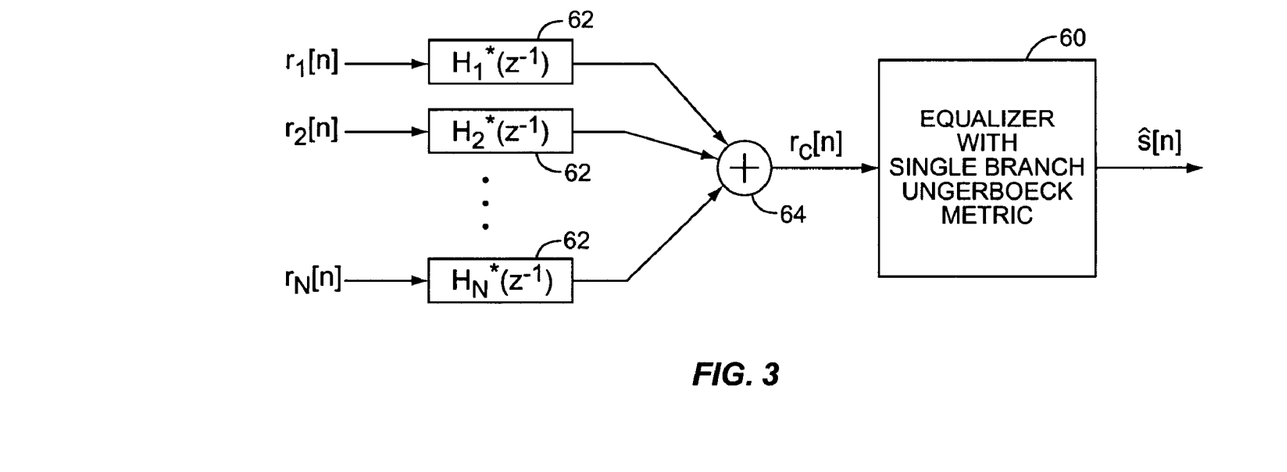
FIG. 3 is a block diagram of equalizer for a multi-branch receiver that uses a single-branch Ungerboeck metric.

FIG. 3 illustrates an equalizer 60 for a multiple antenna receiver that employs the Ungerboeck metric. When the Ungerbaoeck metric is used in a multiple antenna receiver, the received signals from each antenna 44 are filtered by matched filters 62 and combined by combiner 64 before the branch metric is computed. The equalizer computes the metric directly on the combined signal. For this implementation, the following branch metric is computed.

$$M_2(r, h, s) = \qquad \text{Eq. 2}$$

$$\sum_n \Re \left\{ s*[n] \left[ 2r_c[n] - \gamma[0]s[n] - 2\sum_{M=1}^{L-1} \gamma[m]s[n-m] \right] \right\}$$

where $$\gamma[m] = \sum_{i=1}^{N_r} \sum_{k=-(L-1)}^{L-1} h_i[k]h_i^*[k-m]$$

and $$r_c[n] = \sum_{i=1}^{N_r} \sum_{m=0}^{L-1} h_i^*[m]r_i[n+m]$$

is the combined, matched-filtered signal. While the number of antennas 44 does not affect the metric computation, the Ungerboeck metric is more difficult to compute than the Forney metric. Further, fewer reduced complexity techniques use the Ungerboeck metric.

Figure 4:
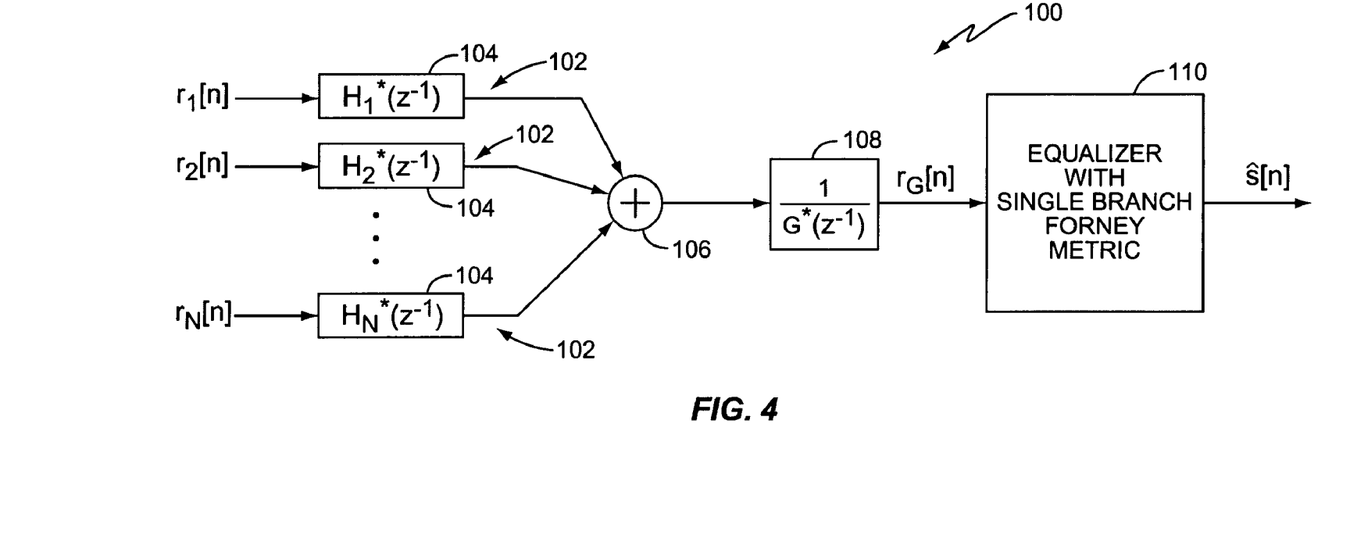
FIG. 4 is a block diagram of a multi-branch receiver according to a first embodiment of the present invention that uses a single-branch Forney metric.

FIG. 4 illustrates a receive signal processor 100 for a multiple antenna receiver or a multi-branch receiver. The receive signal processor 100 in FIG. 4 may be used for the received signal processor 22 in FIG. 1. The present invention is not limited to multiple antenna receivers and may be employed in single antenna receivers with multiple signal branches. For example, multiple branch input signals can be obtained by oversampling a received signal and feeding each symbol-spaced sample set to a different signal branch. In another embodiment of the invention, the in-phase and quadrature components of a received signal can be processed in separate signal branches.

The received signal processor 100 comprises a plurality of signal branches 102 with matched filters 104, a combiner 106 to combine the branch output signals to form a combined baseband signal, a prefilter 108 to give the combined baseband signal minimum phase channel characteristics, and an equalizer 110. In a multiple antenna receiver, each antenna 44 is coupled to a respective signal branch 102 to provide branch input signals. As noted above, the present invention is not limited to multiple antenna receivers.

The matched filters 104 filter the signals received by each antenna 44, which are referred to herein as diversity signals. The matched filter 104 is a linear filter designed to provide the maximum signal-to-noise ratio (SNR) at its output. The filter function of the matched filter is the time-reversed conjugate of the channel impulse response for the corresponding signal branch. If $H_i(z)$ denotes the z-transform of the channel impulse response of the signal branch, the branch input signals are filtered by matched filters with the z-transform $H_i^*(z^{-1})$. The notation $H^*(z) \equiv (H(z^*))^*$ here denotes the conjugate of all coefficients of H(z) but not the variable z.

The branch output signals are combined in combiner 106 to produce a combined baseband signal. The combined baseband signal is then filtered by a prefilter 108 with z-transform $1/G^*(z^{-1})$, where G(z) is a minimum-phase spectral factor of the combined channel response that satisfies the equation $$G^*(z^{-1})G(z) = \sum_{i=1}^{N_r} H_i^*(z^{-1})H_i(z) \quad \text{Eq. 3}$$

The resulting single-branch output signal $r_G[n]$ is then fed into an equalizer with the Forney metric $$M_3(r, h, s) = \sum_n \left| r_G[n] - \sum_{k=0}^{L-1} g[k]s[n-k] \right|^2 \quad \text{Eq. 4}$$

where g(k) denotes the impulse response of G(z). The prefilter 108 is a causal filter that provides minimum phase channel characteristics to the composite baseband signal. The existence of the spectral factor G(z) that satisfies Eq. 3 has been established by D. C. Youla, *On Factorization of Rational Matrices*," IRE Trans. on Information Theory, pp. 172-189, July 1961. Many low-complexity spectral factorization algorithms exists and are well-known in the art. Algorithms for computing the minimum phase spectral factor are described in W. G. Tuel, Jr., *Computer Algorithms for Spectral Factorization of Rational Matrices*, IBM Journal, pp. 163-170, March 1968 and G. Wilson, *Factorization of the Covariance Generating Function of a Pure Moving Average Process*, SIAM J. Numer. Anal., vol. 6, pp. 1-7, March 1969. If desirable, after the spectral factor G(z) is obtained, the time-domain coefficients of the prefilter, whose z-transform equals $1/G^*(z^{-1})$, can be easily computed using long division, as it is well understood by those skilled in the art.

Note that similar to $M_2$, the computation of the new metric $M_3$ does not grow with the number of receiver branches $N_r$. Only the number of matched filters 104 increases, whose complexity is much lower than computing the equalizer metric. The combined matched filtered signals do not lose any information for symbol sequence detection when the underlying signal disturbance is white and Gaussian. Furthermore, it can be shown that the metrics $M_1(r,h,s)$ and $M_3(r,h,s)$ are in fact equivalent in the sense that their difference is independent of the hypothesized symbol sequences. Hence, equalizers that employ either $M_1$ or $M_3$ will provide essentially the same performance regardless of the true probability distribution of the signal disturbance.

Figure 5:
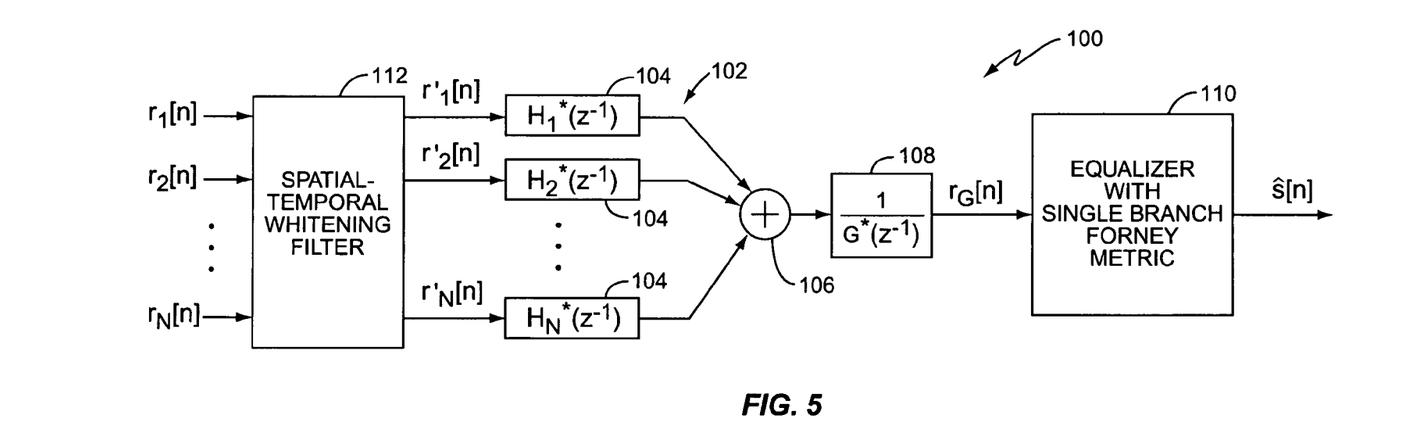
FIG. 5 is a block diagram of a multi-branch receiver according to a second embodiment of the present invention that uses a single-branch Forney metric.

The invention described thus far provides optimum performance when the noise across different receiver branches 102 is uncorrelated, both in time and across signal branches 102. FIG. 5 illustrates an embodiment of the invention adapted for situations when the noise across different signal branches 102 is spatially or temporally colored. As shown in FIG. 5, the branch input signals are first filtered by a spatial-temporal whitening filter 120 before match filtering and combining. The input and output of the whitening filter 120 is related by $$\begin{pmatrix} r_1'[n] \\ r_2'[n] \\ \vdots \\ r_{N_r}'[n] \end{pmatrix} = \sum_{k=0}^{M} A[k] \begin{pmatrix} r_1[n-k] \\ r_2[n-k] \\ \vdots \\ r_{N_r}[n-k] \end{pmatrix} = \quad \text{Eq. 5}$$

$$\begin{bmatrix} A_{1,1}[k] & A_{1,2}[k] & \ldots & A_{1,N_r}[k] \\ A_{2,1}[k] & A_{2,2}[k] & \ldots & A_{2,N_r}[k] \\ \vdots & \vdots & \ldots & \vdots \\ A_{N_r,1}[k] & A_{N_r,2}[k] & \ldots & A_{N_r,N_r}[k] \end{bmatrix} \begin{pmatrix} r_1[n-k] \\ r_2[n-k] \\ \vdots \\ r_{N_r}[n-k] \end{pmatrix}$$

where $\{A[k]\}_{k=0}^{M}$ denotes the set of matrix coefficients of the spatial-temporal whitening filter. In the receiver structure depicted in FIG. 5, the matched filter coefficients should preferably be chosen according to the equivalent channel impulse response of each signal branch 102 after whitening. Well-known techniques, such as the indirect generalized least-squares method may be used to estimate both the whitening filter coefficients $\{A[k]\}_{k=0}^{M}$ and the equivalent composite channel response of each signal branch 102. The generalized least squares method is described in Torsten Soderstrom and Petre Stoica, *System Identification*, Prentice Hall, 1989.

Figure 6:
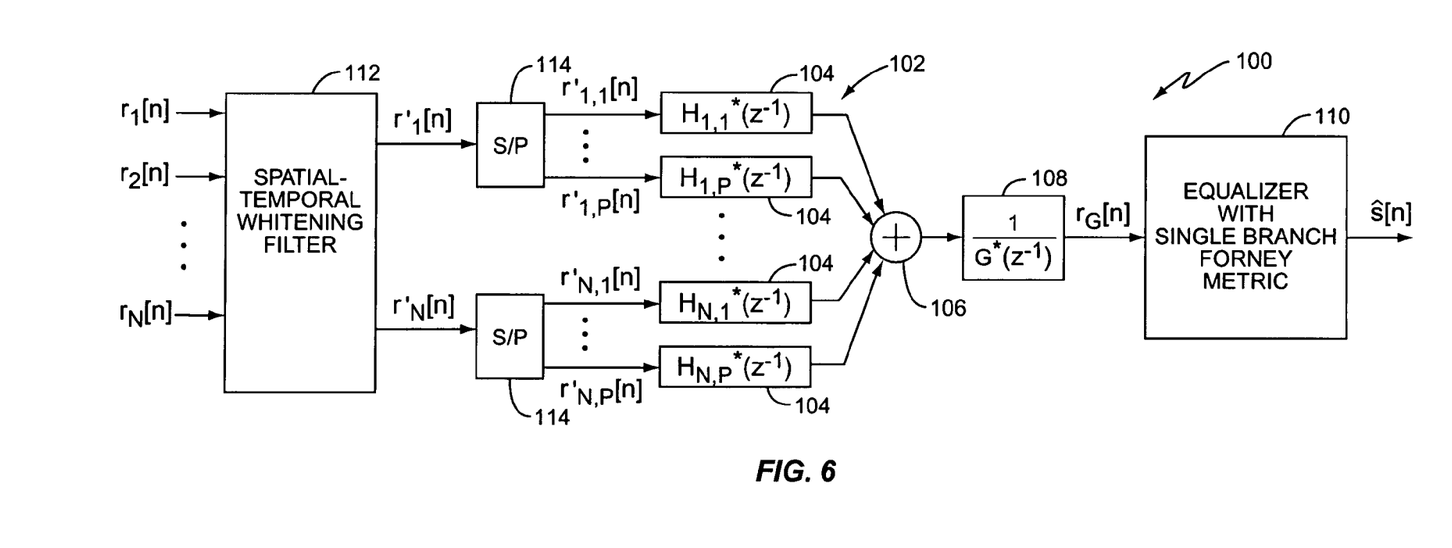
FIG. 6 is a block diagram of a multi-branch receiver according to a third embodiment of the present invention that uses a single-branch Forney metric.

FIG. 6 illustrates a third embodiment of the invention for the situation when the sampling rate of the multiple signal branches is an integer-multiple of the baud rate. In this embodiment, a serial-to-parallel (S/P) converter 114 is inserted in each signal branch 102 between the whitening filter 120 and the matched filter 104, which converts a P-time oversampled signal into P baud rate sample streams. The outputs of the S/P converters 114 are simply given by $$r_{i,j}'[n] = r_i'[Pn+j-1] \quad \text{Eq. 6}$$

for i=1, 2, . . . , $N_r$, j=1, 2, . . . , P, and all n.

Figure 7:
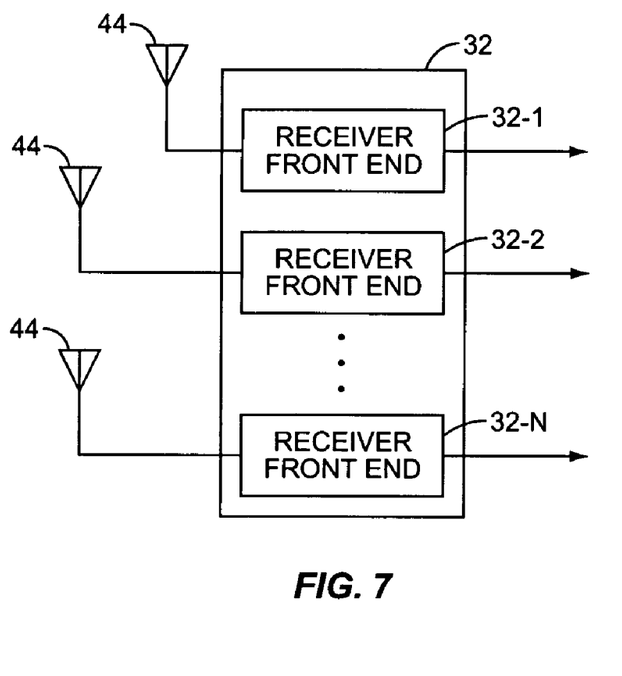
FIGS. 7-9 are block diagrams of a receiver front end for the multi-branch receiver of the present invention.
Figure 8:
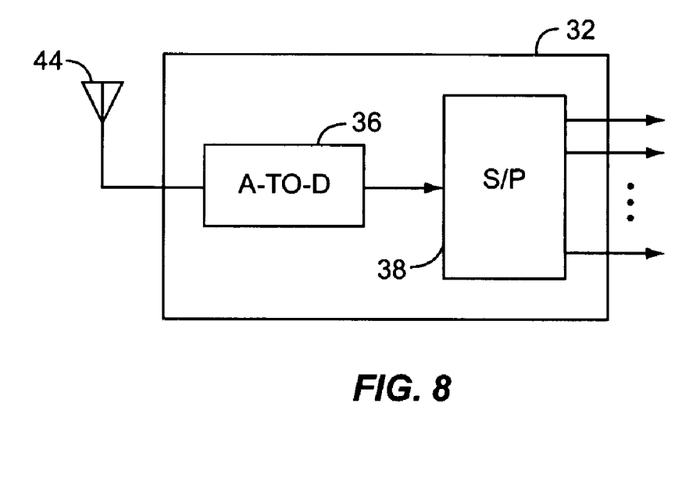
Figure 9:
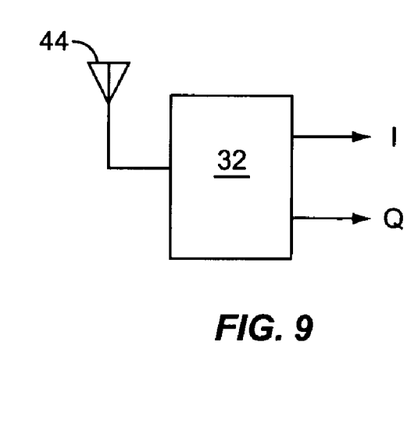

FIGS. 7-9 illustrate receiver front ends 32 for use with the present invention. FIG. 7 is a front end for a multiple antenna receiver, while FIGS. 8 and 9 show front ends 32 for single antenna receivers. The receiver front end 32 in FIG. 7 comprises a plurality of front ends 32-1 through 32-N coupled to respective antennas 44. Each front end 32-1 through 32-N provides a branch input signal to a corresponding signal branch 102. In FIG. 8, the receiver front end 32 includes an A-to-D converter 36 and serial-to-parallel converter 38. The A-to-D converter 36 provides an oversampled signal, preferably at some integer multiple of the symbol rate. The serial-to-parallel converter 38 divides the oversampled signal into multiple symbol-spaced sample streams that are applied to respective signal branches 102 of the receive signal processor 100. In FIG. 9, the front end 32 applies the in-phase and quadrature components of the received signal to separate signal branches 102.

Equalizer 110 may comprise a maximum likelihood sequence estimation (MLSE) equalizer, a decision feedback (DFE) equalizer, a decision feedback sequence estimation (DFSE) equalizer, or a reduced state sequence estimation equalizer (RSSE), all of which are well-known in the art. MLSE equalizers are described in Forney, *Maximum-Likelihood Sequence Estimation of Digital Sequences in the Presence of Intersymbol Interference*, IEEE Trans. Info. Theory, vol. IT-18, pp. 363-378, May 1972. DFE equalizers are described in J. R. Proakis, *Digital Communications*, McGraw-Hill, #rd Ed. 1989, pp. 593-600. DFSE equalizers are described in A. Duel-Hallen and C. Heegard, *Delayed Decision-Feedback Sequence Estimation*, IEEE Trans. on Commun., vol 37, pp. 428-436, May 1989. RSSE equalizers are described in M. V. Eyuboglu and S. U. H. Qureshi, *Reduced-State Sequence Estimation With Set partitioning and Decision Feedback*, IEEE Trans. on Commun., vol. 36, pp. 13-20, January 1988. These articles are incorporated herein by reference.

The invention is beneficial for receivers of the GSM/EDGE systems that have multiple antennas, such as a cellular base station. It also facilitates the development of multiple-antenna mobile stations since the inventive structure allows the same software and hardware designed for single-antenna receiver to be reused in multiple antenna receivers.

The invention claimed is:

1. A multi-branch receiver comprising:
   a plurality of signal branches including branch filters to filter respective branch input signals and to produce corresponding branch output signals;
   a combiner to combine the branch output signals from said branch filters to produce a combined baseband signal;
   a pre-filter to filter the combined baseband signal to produce a received signal with minimum phase channel characteristics; and
   an equalizer to generate an estimate of a data sequence contained in the received signal.

2. The multi-branch receiver of claim 1 wherein said plurality of branch input signals comprise two or more diversity signals received by two or more receive antennas.

3. The multi-branch receiver of claim 1 wherein said plurality of branch input signals comprise two or more signals received by a single antenna.

4. The multi-branch receiver of claim 3 wherein said plurality of branch input signals comprise two or more signal sample sequences with different sampling phases.

5. The multi-branch receiver of claim 4 wherein said plurality of branch input signals comprise quadrature and in-phase signals.

6. The multi-branch receiver of claim 1 wherein each branch filter comprises a matched filter matched to the channel impulse response of a corresponding signal branch.

7. The multi-branch receiver of claim 1 wherein said equalizer comprises a maximum likelihood sequence estimation equalizer.

8. The multi-branch receiver of claim 1 wherein said equalizer comprises a decision feedback equalizer.

9. The multi-branch receiver of claim 1 wherein said equalizer comprises a decision feedback sequence estimation equalizer.

10. The multi-branch receiver of claim 1 wherein said equalizer comprises a reduced state sequence estimation equalizer.

11. The multi-branch receiver of claim 1 further comprising a whitening filter preceding said branch filters to whiten noise in said branch input signals.

12. The multi-branch receiver of claim 11 wherein said branch input signals are oversampled signals and wherein said signal branches further comprise a serial-to-parallel converter generate a plurality of branch output signals for each signal branch.

13. A method of receiving signals in a multi-branch receiver, said method comprising:
   filtering branch input signals in respective signal branches of the multi-branch receiver to produce branch output signals;
   combining the branch output signals to produce a combined baseband signal;
   prefiltering the combined baseband signal to provide a received signal with minimum phase channel characteristics; and
   equalizing the received signal to provide an estimate of a transmitted data sequence.

14. The method of claim 13 wherein said branch input signals comprise two or more diversity signals received by two or more antennas.

15. The method of claim 13 wherein said plurality of branch input signals comprise two or more signals received by a single antenna.

16. The method of claim 15 wherein said plurality of branch input signals comprise two or more sample sequences with different sampling phases.

17. The method of claim 15 wherein said plurality of branch input signals comprise quadrature and in-phase signals.

18. The method of claim 13 wherein said branch input signals are filtered by matched filters matched to the channel impulse responses of said signal branches.

19. The method of claim 13 wherein said composite baseband signal is equalized by a maximum likelihood sequence estimation equalizer.

20. The method of claim 13 wherein said composite baseband signal is equalized by a decision feedback equalizer.

21. The method of claim 13 wherein said composite baseband signal is equalized by a decision feedback sequence estimation equalizer.

22. The method of claim 13 wherein said composite baseband signal is equalized by a reduced state sequence estimation equalizer.

23. The method of claim 13 further comprising whitening said branch input signals prior to filtering said branch input signals.

24. The method of claim 23 wherein said branch input signals are oversampled signals and further including converting the oversampled branch input signal into a plurality of symbol-spaced sequences.

* * * * *